3,179,617
SOLVENT SYSTEM FOR COATING AND
ADHESIVE COMPOSITIONS
Clarence D. Moore, Manor Township, Lancaster County, Pa., assignor to Armstrong Cork Company, Lancaster, Pa., a corporation of Pennsylvania
No Drawing. Filed Feb. 26, 1960, Ser. No. 11,127
6 Claims. (Cl. 260—32.8)

This invention relates generally to coating compositions and more particularly to coating compositions containing rubbery elastomers. Still more particularly the invention relates to coating compositions, suitable for spraying or brushing, which will not form thin filaments and strings during application.

Sprayable and brushable coating compositions frequently exhibit the phenomenon called cobwebbing. When a composition is sprayed, the phenomenon of cobwebbing manifests itself by the formation of a multitude of tiny strings and filaments reminiscent of cobwebs. These filaments result from the rapid evaporation of the solvent system of the coating composition during the time the composition is in the air between the spray nozzle and the object to be coated. The cobwebbing phenomenon is most unsatisfactory. Not only does it waste materials, but it renders the work area unsightly and dirty, and demands an undue amount of time spent in cleaning up.

It is the primary object of the present invention to supply a coating composition wherein cobwebbing is substantially reduced or eliminated entirely. It is a further object of the present invention to supply a coating composition which when applied by means of a spray mechanism or brush will not produce filaments and strings of the coating composition, but will instead deposit a smooth, even layer of a rubbery elastomer onto the surface to be coated.

These objects are accomplished in a surprisingly effective manner by utilizing a mixture of a rubbery elastomer and a special solvent system. The invention contemplates a rubbery elastomer dissolved in a solvent system therefor. The solvent system comprises three liquids selected from the group consisting of organic liquids and water. The first of these liquids has a boiling point in the range of about 100°–175° C. and is a solvent for the rubbery elastomer. The second of the liquids has a boiling point lower than that of the first liquid and is in the range of about 50°–150° C.; this second liquid must be a non-solvent for the rubbery elastomer. The mixture of the first liquid and the second liquid must also be a non-solvent for the elastomer. The third liquid must have a boiling point lower than that of the second liquid and be in the range of about 35°–95° C. The mixture of the three liquids must be a solvent for the elastomer.

The rubbery elastomer contemplated for use in the present invention may be any of the synthetic rubbers such as butadiene-styrene copolymers, butadiene-acrylonitrile copolymers, polychloroprene, chlorosulfonated polyethylene, the polysulfide rubber known as "Thiokol" and other rubbery elastomers. The particular rubbery elastomer selected for use in the present invention is not critical. For every rubbery elastomer there are various solvents and non-solvents having various boiling point ranges. Therefore it will be possible to select a solvent system according to the teachings of the present invention for all rubbery elastomers. The rubbery elastomer to be used in any particular composition will be selected according to the requirements for the particular coating or adhesive use. The characteristics of the various rubbery elastomers are well known and may be used to select the rubbery elastomer needed to perform as desired in the coating of wood, plastics, cloth, paper, metal, glass and ceramics, and any other desired materials. Various adhesive films may be spray-or brush-coated onto objects to be adhesively secured to other objects. In such cases additional ingredients such as fortifying or tackifying resins, fillers, pigments, antioxidants, vulcanizing agents, and other ingredients used in adhesive compositions may be added to the composition of the present invention.

The solvent system of the composition of the present invention must contain at least three liquids, each of which is non-reactive with the rubbery elastomer or with each other or with any other ingredient in the composition. The solvent system must be a solvent for the rubbery elastomer. The solvent system is so chosen and selected that the system passes through various stages of solvating power for the rubbery elastomer during the evaporation of the system. On spraying or brushing the composition, the immediate loss of some of the most volatile components of the solvent system causes the remaining portion of the system to become a non-solvent for the rubbery elastomer, causing dispersion and breakup and the forming of a non-blocking coating free from cobwebbing. The non-solvent system containing discrete particles or blobs of the rubbery elastomer is the condition of the composition which initially deposits on the object to be coated. When the film is in position, the loss of the next most volatile component changes the characteristics of the solvent system once again so that the remaining liquid is a solvent for the rubbery elastomer. This remaining solvent then dissolves the rubber and produces a continuous and coherent film which remains as a continuous film while the final solvent dries. Thus the solvent system passes through three stages during drying of the composition. The first stage is a complete solvent for the rubbery elastomer. The second stage is substantially a non-solvent for the rubbery elastomer. The third stage is again a complete solvent for the rubbery elastomer.

The operation of the solvent system is readily seen by dipping a spatula into a coating composition of the present invention, and allowing the excess composition to drain from the spatula in air. Initially, the film draining from the spatula is clear and water white. Soon, however, the clear film begins to cloud and becomes milky and opaque; discrete particles may be seen in the film. On additional standing, the milkiness and cloudiness disappear, and the film once again becomes clear and water white. The final clear film will dry as the last of the solvents evaporates, leaving a coating of the rubbery elastomer admixed with any desired ingredients.

The above discussion points out the fact that each of the three inert liquids comprising the solvent system must possess certain characteristics. A convenient starting point to describe the composition is the least volatile organic liquid; this is the last organic liquid to evaporate from the composition. Since this organic liquid must leave a continuous film of the rubbery elastomer, this liquid must be a complete solvent for the rubbery elastomer, whatever it is. Additionally the boiling point of this organic liquid must be the highest in the solvent system, and must be relatively high in order that evaporation does not take place too rapidly. A boiling point in the range of about 100°–175° C. has been found to define the practical boiling point range of this portion of the system. Boiling points lower than about 100° C. evaporate too fast, rendering it difficult, if not impossible, to select the other two components for the solvent system with their requisite boiling points even lower than the boiling point of the liquid under discussion. At the other end of the range, a boiling point greater than about 175° C. produces such a slow-drying film as to be substantially impractical. Even though the films resulting from the compositions of the present invention may be heated to hasten drying and cure, solvents which boil above 175° C. are generally impractically slow. The chemical composition of this part of the solvent system will be discussed below.

The second of the three liquids which must be present in the solvent system of the present invention will have a boiling point lower than that of the first liquid described above, and the boiling point of this second liquid will be in the range of about 50°–150° C.; the boiling point overlapping of the first and second liquids is deliberate and will be explained subsequently. Additionally, this second liquid must be a non-solvent for the rubbery elastomer. Additionally, the mixture of the first liquid and the second liquid must also be a non-solvent for the rubbery elastomer. It can be seen from the description earlier that the mixture of the first two liquids—being a non-solvent for the elastomer—is the phase of the solvent system which prevents the cobwebbing or stringing of the composition during application.

The third of the liquids in the solvent system must have a boiling point lower than that of the second liquid described immediately above. The boiling point of the third liquid will be in the range of about 35°–95° C. It should be noted here that the boiling point range of the second liquid overlaps with the boiling point ranges of both the first liquid and the third liquid. However, the boiling point ranges of the first liquid and the third liquid do not overlap. The requirement that each of the liquids possess a boiling point lower than the boiling point of any liquid ahead of it in non-volatility completely describes the boiling point characteristics of each of the three liquids in combination. Regarding the third liquid, it cannot be stated that this third liquid be either a solvent or a non-solvent for the rubbery elastomer; it may be either. The express requirement for this third liquid in regard to solventability, however, is that in combination with the mixture of the first two liquids, the third liquid must form a complete solvent system for the rubbery elastomer. As is well known, it is perfectly possible to form a solvent system for a polymer out of two non-solvents for that polymer. Therefore this third and most volatile liquid may be a non-solvent for the rubbery elastomer so long as the third liquid forms a solvent system with the non-solvent mixture of the first two liquids.

The chemical composition of any of the three inert liquids in the composition of the present invention is unimportant. The boiling points and the ability to dissolve the rubbery elastomer are all that matter. Widely divergent chemical compositions may be used so long as the properties of the liquids meet the requirements stated above. For example, utilizing polychloroprene as the rubbery elastomer, the three-component solvent system may well comprise xylene (boiling point 135° C.) as the first liquid which is a solvent for neoprene. The second liquid, the non-solvent for neoprene, may be heptane (boiling point 90° C.). The mixture of xylene and heptane is a non-solvent for neoprene providing xylene does not exceed about 60% by weight of the xylene-heptane mixture. The third liquid, the most volatile component, may be acetone (boiling point 56° C.) which is also a non-solvent for neoprene but which in combination with the xylene and heptane forms a solvent system for the neoprene. Thus in this solvent system we have a hydrocarbon, xylene, as the least volatile solvent for neoprene, and a ketone, acetone, as the most volatile ingredient. This situation can be exactly reversed by using cyclohexanone (boiling point 152° C.) as the least volatile solvent for neoprene, ethyl alcohol (boiling point 77° C.) as the second liquid which is a non-solvent for neoprene, and hexane (boiling point 63° C.) as the most volatile ingredient. Thus in this second illustration we have exactly the reverse of the first illustration in that a ketone is the least volatile ingredient and a hydrocarbon is the most volatile ingredient.

Where the term "solvent" is used in the present application and claims, it is intended to mean an inert organic liquid which dissolves the rubbery elastomer. This terminology is in accordance with generally accepted nomenclature of what is a solvent and what is not. Where a solvent is called for, a partial solvent or a swelling agent will not do. On the other hand, where a non-solvent is called for, again a swelling agent will not do. There are certainly no absolutes regarding the ability of liquids to dissolve solvents, but a rule of reason is readily available in the present instance to form a good non-cobwebbing coating or adhesive composition. It is apparent that all the solvents needed to form the solvent system of the present invention will fall into a few chemical classes. The usable solvents and non-solvents will be aliphatic, aromatic, and mixed hydrocarbons; halogenated hydrocarbons, particularly chlorinated hydrocarbons; alcohols, particularly lower-alkyl monohydroxyl alcohols containing 1–4 carbon atoms; water; and ketones.

The boiling point ranges of the three liquids which make up the solvent system of the present invention are such that the individual solvents may be described as (1) slow: 100°–175° C., (2) medium: 50°–150° C., and (3) fast: 35°–95° C.

The relative amounts of the various liquids to be used in the solvent system of the present invention will be controlled by the particular solventability of the particular liquids as well as by the solids content desired in the final product. Generally speaking, the first liquid, the relatively high boiling solvent for the rubbery elastomer, will be present in an amount of about 100–500 parts by weight per 100 parts by weight of the rubbery elastomer. The second liquid, which is the second highest boiler and the non-solvent for the rubbery elastomer, will generally be present in an amount of 10–350 parts by weight per 100 parts by weight of the rubbery elastomer. The third liquid, the lowest boiler, will generally be present in an amount of about 10–185 parts by weight per 100 parts by weight of the rubbery elastomer. Since some of this ingredient will flash off immediately when the coating composition is being applied, it will be present in most instances in the smallest amount of any of the three.

The designing of a particular solvent system for a coating composition of the present invention is easily carried out. The rubbery elastomer is taken up in any solvent therefor which boils within the requisite 100°–175° C. range; this liquid is the first liquid as defined earlier. When a sufficient amount of the rubber has been dissolved—or when all of it has been dissolved—there may then be poured into the solution the second liquid which is a non-solvent for the rubber and which has a boiling point within the range 50°–150° C. and which boiling point is also lower than that of the first liquid. This second liquid is simply poured into the solution until the rubber precipitates from solution. The amount of rubber to be precipitated may vary but should usually be at least about half the rubber in solution. Many of these non-solvents will swiftly precipitate the rubber in solution. As a final step then the third lowest boiling liquid is poured into the non-solvent mixture of rubber and the first two liquids until the rubber has been redissolved. As an aid in selecting this third, most volatile organic liquid, the concept of solubility parameters may be utilized to produce a three-component solvent system possessing an over-all solubility parameter which matches that of the rubbery elastomer and which accordingly will dissolve that elastomer.

The actual manufacture of the coating compositions of the present invention is readily caried out by merely mixing the requisite amounts of the three liqiuds and dissolving in the resulting mixture the rubber and any other ingredients desired.

The following examples illustrate several embodiments of the invention. All parts are by weight unless otherwise stated.

*Example 1*

An adhesive composition having the following formulation was prepared.

Ingredients: Parts
Polychloroprene _____ 100
Oil-soluble, heat-advancing tertiary butyl phenol-formaldehyde resin (CKR–1634) _____ 45
Acetone (B.P. 56° C.) _____ 50
Xylene (B.P. 135° C.) _____ 250
Heptane (B.P. 90° C.) _____ 200

The three liquids were mixed in a container and the resin was dissolved therein by stirring. The polychloroprene was cut into small chunks and stirred into the resin solution. The final composition was clear and sprayable.

On spraying, no cobwebbing developed; no filaments or stringers of any kind were formed. When the composition struck the specimen being sprayed, the film appeared white and milky for about one minute, finally turning clear and transparent. Subsequently the film air-dried leaving a thin film of an adhesive which formed a strong, tough bond when a piece of sheet aluminum was pressed against it.

*Example 2*

A series of coating compositions was prepared made up of the following ingredients in the amounts indicated:

| Ingredients | Boiling Point, Degrees C. | Parts | | | |
|---|---|---|---|---|---|
| | | A | B | C | D |
| Butadiene-acrylonitrile copolymer (Paracril C) | | 100 | 100 | 100 | 100 |
| Cyclohexanone | 155 | 240 | 268 | 395 | |
| Monochlorobenzene | 132.1 | | | | 415 |
| Denatured alcohol | 78 | 1 262 | | 140 | |
| Isopropyl alcohol | 80 | | 1 320 | | |
| Water | 100 | | | 1 34 | |
| Aliphatic hydrocarbons plus naphthenes (Benzosol) | 65–83 | | | | 1 128 |
| Toluene | 111 | | 1 85 | | |
| Hexane | 69 | | 85 | | |
| Acetone | 56 | 67 | | | 30 |
| Methyl ethyl ketone | 79 | | | | |

¹ This is the medium boiling solvent.

Each of the above compositions sprayed with no cobwebbing. The sprayed object (variously wood, aluminum sheets, small iron fittings), after drying for two days at room temperature, was found to be coated with a thin continuous film of the Buna N type rubber.

*Example 3*

A composition was prepared of 100 parts butadiene-styrene copolymer (GR–S 1013), 320 parts exylene (B.P. 135° C.), 86 parts denatured alcohol (B.P. 78° C.), and 185 parts hexane (B.P. 69° C.). This composition could be sprayed and brushed onto wood with no stringing or cobwebbing yielding a fast-drying continuous film of rubber on metal objects.

*Example 4*

A series of coating compositions was made having the following ingredients:

| Ingredients | Boiling Point, Degrees C. | Parts | | |
|---|---|---|---|---|
| | | A | B | C |
| Chlorosulfontted polyethylene (Hypalon 30) | | 100 | 100 | 100 |
| Monochlorobenzene | 132.1 | 320 | 432 | |
| Cyclohexanone | 155 | | | 370 |
| Acetone | 56.5 | 45 | 73 | 66 |
| Denatured alcohol | 78 | | 1 64 | 1 132 |
| Aliphatic hydrocarbon plus naphthenes (Benzosol) | 65–83 | 1 204 | | |

¹ This is the medium boiling solvent.

The above coating composition sprayed without cobwebbing and formed, on drying, a continuous coherent film of chlorosulfonated polyethylene on metal objects.

I claim:
1. A non-cobwebbing, sprayable coating composition comprising a synthetic rubber selected from the group consisting of butadiene-styrene copolymers, butadiene-acrylonitrile copolymers, polychloroprene, chlorosulfonated polyethylene, and polysulfide rubber dissolved in a solvent system therefor, said solvent system comprising three liquids selected from the group consisting of aliphatic hydrocarbons, aromatic hydrocarbons, mixed aliphatic-aromatic hydrocarbons, halogenated hydrocarbons, alcohols, water, and ketones, the first of said liquids having a boiling point in the range of about 100°–175° C. and being a solvent for said rubber, the second of said liquids having a boiling point lower than that of said first liquid and being in the range of about 50°–150° C. and being a non-solvent for said rubber, the mixture of said first liquid and said second liquid being a non-solvent for said rubber, the third of said liquids having a boiling point lower than that of said second liquid and being in the range of about 35°–95° C., the mixture of said first liquid, said second liquid, and said third liquid being a solvent for said synthetic rubber, and wherein said first liquid is present in an amount of about 100–500 parts by weight, said second liquid is present in an amount of about 10–350 parts by weight, said third liquid is present in an amount of about 10–185 parts by weight, all based on 100 parts by weight of said synthetic rubber.

2. A composition according to claim 1 wherein said synthetic rubber comprises polychloroprene.

3. A composition according to claim 1 wherein said first liquid comprises a hydrocarbon and said third liquid comprises a ketone.

4. A composition according to claim 1 wherein said synthetic rubber comprises a butadiene-acrylonitrile copolymer.

5. A composition according to claim 1 wherein said synthetic rubber comprises a chlorosulfonated polyethylene.

6. A composition according to claim 2 wherein said first liquid comprises a ketone and said third liquid comprises a hydrocarbon.

References Cited by the Examiner
UNITED STATES PATENTS

| | | | |
|---|---|---|---|
| 2,431,078 | 11/47 | Powell et al. | 260—34.2 |
| 2,468,989 | 5/49 | Luaces | 260—34.2 |
| 2,672,793 | 3/54 | Rowe et al. | 260—32.8 |
| 2,732,357 | 1/56 | Sprung | 260—32.8 |
| 2,825,709 | 3/58 | Sturm | 260—32.8 |
| 2,872,366 | 2/59 | Kiernan et al. | 260—32.8 |
| 2,876,206 | 3/59 | Green | 260—32.8 |

MORRIS LIEBMAN, *Primary Examiner.*

DANIEL ARNOLD, *Examiner.*